(12) United States Patent
DeLong

(10) Patent No.: US 6,885,772 B2
(45) Date of Patent: Apr. 26, 2005

(54) PROCESS FOR CYCLIC, INTERACTIVE IMAGE ANALYSIS, AND ALSO COMPUTER SYSTEM AND COMPUTER PROGRAM FOR PERFORMING THE PROCESS

(75) Inventor: Wolf-Rüdiger DeLong, Erlangen (DE)

(73) Assignee: Carl Zeiss Vision GmbH, Hallbergmoos (DE)

(*) Notice: Subject to any disclaimer, the term of this patent is extended or adjusted under 35 U.S.C. 154(b) by 585 days.

(21) Appl. No.: 09/828,031

(22) Filed: Apr. 6, 2001

(65) Prior Publication Data

US 2002/0012466 A1 Jan. 31, 2002

(30) Foreign Application Priority Data

Apr. 8, 2000 (DE) .......................................... 100 17 551

(51) Int. Cl.[7] .............................................. G06K 9/62
(52) U.S. Cl. ...................................... 382/224; 382/199
(58) Field of Search ................................ 382/129, 133, 382/159, 173, 181, 190, 199, 224, 258, 276

(56) References Cited

U.S. PATENT DOCUMENTS

| | | | |
|---|---|---|---|
| 5,671,294 A | * 9/1997 | Rogers et al. | ............... 382/228 |
| 5,761,385 A | 6/1998 | Quinn | .......................... 706/20 |
| 6,044,171 A | * 3/2000 | Polyakov et al. | ........... 382/159 |
| 6,078,680 A | * 6/2000 | Yoshida et al. | ............. 382/128 |
| 6,408,107 B1 | * 6/2002 | Miller et al. | ................. 382/294 |
| 6,496,560 B1 | * 12/2002 | Lin et al. | ....................... 378/62 |

FOREIGN PATENT DOCUMENTS

| | | | |
|---|---|---|---|
| DE | 196 25 906 A1 | 6/1996 | ........... G06F/15/18 |
| DE | 197 05 017 A1 | 2/1997 | ............ G06K/9/46 |
| DE | 197 30 512 C1 | 7/1997 | .......... H04N/5/325 |
| EP | 0 769 760 B1 | 5/1998 | ............. G06T/7/00 |
| WO | WO 99/40593 | 8/1999 | ............. G06T/5/00 |

OTHER PUBLICATIONS

Kamel, et al. "A Division Vision Classification System Using Fourier Descriptors", IEEE, pp. 424–426, 1990.*

Deutsches Patent– und Markenant, 3 pgs, non–English.

"Interactive Display and Analysis of 3–D Medical Images", 10 pgs., R.A. Robb.

European Search Report for Corresponding European Application dated Apr. 20, 2004.

Lassoo!: An interactive Graphical Tool for Seafloor Classification. Dijkstra et al. pp. 1064–1070. 1996.

Radar Remote Sensing: Land Cover Classification. Jaroszewski & Lefevre. pp. 373–378. 1998.

Image Processing Toolbox. User's Guide, Version 2.1. pp. 6–19 to 6–25. Jan. 1998.

* cited by examiner

*Primary Examiner*—Daniel Miriam

(57) ABSTRACT

The invention relates to a process for cyclic, interactive image analysis with the steps of selection by the user of image regions of interest in the image, performance of various preprogrammed transformations on the image at all image points, performance of a normalization of the transformation results, division of the whole normalized transformation space into classes with the aid of separation rules which are derived from the transformation result values in the image regions selected by the user, allocation of the classification obtained in the transformation space to the individual image points, and representation of the thus classified image in the image space.

15 Claims, 5 Drawing Sheets

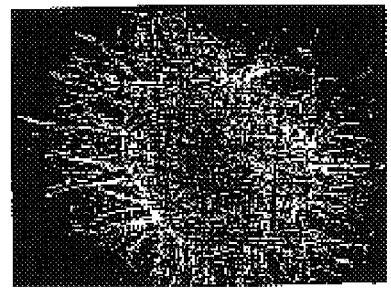
FIG. 3
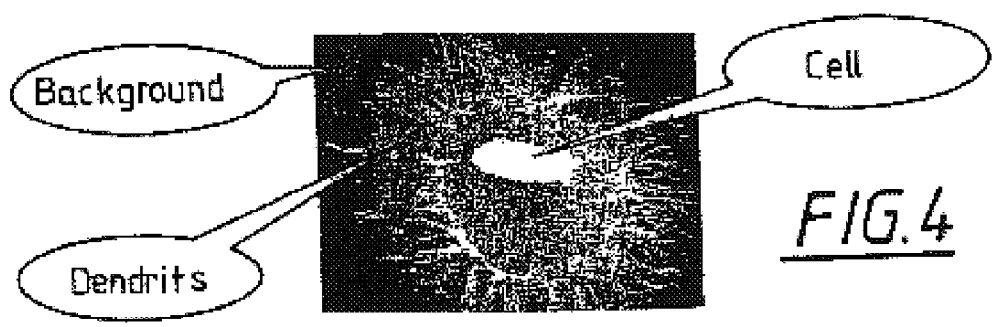
FIG. 4
FIG. 5 FIG. 6
Mean-Value
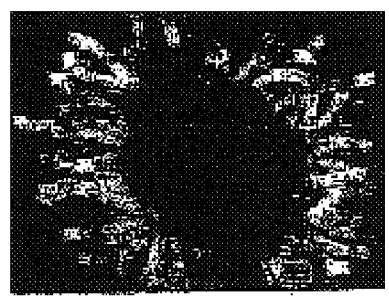
Variance

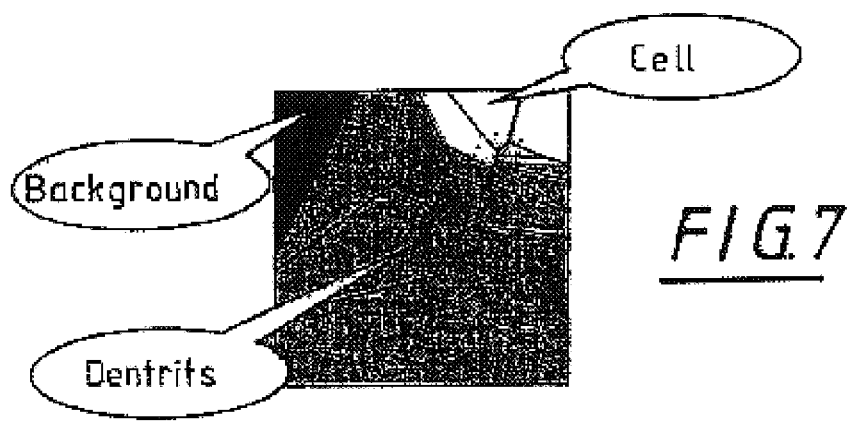
FIG. 7
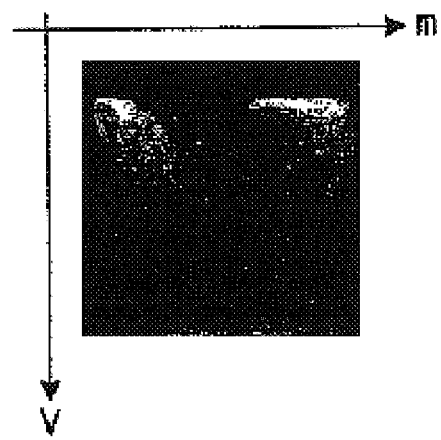
FIG. 8
FIG. 9
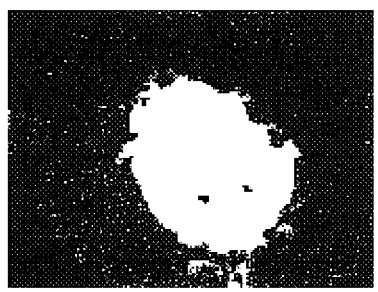
Machine Conception
in Image Space
FIG. 10
Quality - Function
in Image Space

PROCESS FOR CYCLIC, INTERACTIVE IMAGE ANALYSIS, AND ALSO COMPUTER SYSTEM AND COMPUTER PROGRAM FOR PERFORMING THE PROCESS

CROSS-REFERENCE TO RELATED APPLICATIONS

STATEMENT REGARDING FEDERALLY SPONSORED

Not applicable

BACKGROUND OF THE INVENTION

The present invention relates to a process for cyclic, interactive image analysis, and also to a computer system and a computer program for performing a corresponding process.

TECHNICAL FIELD

Many image processing methods known today operate according to the so-called fractal hierarchy, in which the image processing takes place in two steps. In a first, segmentation, step the image is segmented in the local space, that is, divided into different regions. The segmentation takes place according to hierarchy stages, where each pixel of the image represents a segment in the lowest hierarchy stage. For the respective next higher hierarchy stage, the two neighboring segments are combined which produce the smallest increase of the product of the number of pixels and the variance of the color value or gray-scale value for the combined segment. The selection of the segments takes place stochastically. Furthermore, an edge treatment of the segments takes place, in which, for each edge pixel of a segment, it is tested whether it possibly belongs better to the neighboring segment. If necessary, it is so allocated. The theoretically highest hierarchy stage consists only of a single segment. The heirarchy stages have between them the property that segment boundaries of a heirarchy stage remain maintained in the heirarchy stage situated therebelow; that is, the segments are always proper subsets of the segments, situated thereabove, of the higher heirarchy stage.

In a succeeding classification step, a semantic classification takes place, that is, objects with a name are produced from the formed segments. Here rules are given for the formation of objects from a set of predefined properties of the segments in all heirarchy stages. The rules are formulated as fuzzy rules.

Corresponding image processing methods are described in, for example, German Patent Documents DE 196 25 906 A1, DE 197 05 017 A1 and in International Patent Document WO 99/40539. The processes concerned there run either more or less completely automatically or interactively.

The main problem in image analysis is that the images to be analyzed can have completely different, initially unknown and in part highly complex image data, and in addition it is not initially known which image data contained in the image to be analyzed is important to the user. For universal applicability, the known image processing methods therefore require both a very large programming cost in their production and also comprehensive experience on the part of the user in the choice of suitable segmentation and classification rules.

SUMMARY OF THE INVENTION

The present invention has as its object to provide an image analysis process which can cyclically and interactively approximate the wishes and ideas of a user, without the user having to have detailed knowledge of the image processing itself.

This object is attained by a process for cyclic, interactive image analysis with the steps of:

a) a selection by the user of image regions of interest in the image, b) performance of preprogrammed transformations on the image at all image points or at a selection of image points, c) performance of normalization of the individual transformation results, d) division of the whole normalized transformation space into classes with the result of a classification in the transformation space with the aid of separation rules which are derived from the transformation result values in the image regions selected by the user, e) allocation to the individual image points of the classification obtained in the transformation space, f) representation of the thus classified image in the image space.

The object also is attained by a computer system suitable for the performance of the aforementioned process which has devices for the interactive input and selection of image regions. The object also is attained by computer programs which can be loaded into the memory of a digital computer and which has a software code for the performance of the aforementioned process with the steps (a)–(f) set forth above when the code runs on the computer.

The process according to the invention is interactive in the sense that the user in step (a) can select or identify image regions in the image which are of interest to him or are to be differentiated, and after carrying out the image analysis the user is presented in step (f) with a classified image in the image space. The user can adjust anew the criteria for the regions, according to his expert opinion. However, no operation by the user is provided for during the course of the process according to the invention.

The process according to the invention operates cyclically in the sense that the steps (a) through (f) or (b) through (f) can be carried out successively plural times, until the user is satisfied with the presented result of the image analysis.

A segmentation admittedly takes place in the process according to the invention, as in the state of the art; however, this segmentation is carried out in a transformation space. For this purpose, various preprogrammed and stored transformations are first performed on the image in all image points, or in all image points of a selected region. A normalization of the results of the transformations performed in the transformation space takes place thereafter. Directly following this, the whole normalized transformation space is divided into classes, the separation rules for the classification of the transformation result values in the image regions selected by the user being automatically derived. The classification obtained in the transformation space is then allocated in turn to the individual image points, and thus a classified image corresponding to the transformation space is thereafter displayed in the original image space.

The present invention starts from the precondition that the user always has for an image a certain idea of what in the image is to be comprehended as belonging to it for his purposes. The user informs the computer or the image analysis program of this idea of his own by means of regions, which are roughly drawn in and delineated as desired in the image. The image analysis program develops its own interpretation of the user's ideas based on this interactive setting of the task, and shows the user the developed idea. The user can now modify this "machine conception" or "machine idea" produced by the image analysis program by further interactive operations, through which the image analysis program corrects the "machine conception" or "machine idea" according to the user's intention. The user's ideas are aligned with the "machine ideas" in an interplay in this manner, so that the image analysis program knows at the end what ideas the user has. Accordingly, the basic idea of the process according to the invention is a cycle within a cyclic process.

The formation of the mean and variance of the image brightness or of the image color in an image point neighborhood is included under the preprogrammed transformations. A further advantageously preprogrammed transformation for the evaluation is a Radon transformation for the effective representation of lines and edges within the image. The preprogrammed transformations are used in the process according to the invention as completely equivalent, complementary, and orthogonal quantities.

The division of the normalized transformation space can preferably take place such that those regions in the transformation space are identified in which the normalized values of each of the performed transformations corresponds to, or comes close to, the normalized values of the same transformation in the image regions selected by the user.

In the sense of a cyclic process, the user, if he is not yet satisfied with the displayed image after a first run of the process, can select further image regions, or correct the boundaries of the already selected regions, and then allow the whole process to anew run repeatedly. Alternatively, as long as the user has not selected any new image regions or corrected the boundaries of the selected regions, it is possible for the process to be repeatedly performed on the same image with different transformations or different parameters of the transformations.

The sequences of transformations and normalizations or classifications determined according to a single or plural run of the process can be stored and subsequently applied to other similar images.

In a further advantageous embodiment example, in addition to the displaying of the classified image, additional properties of the classification obtained, taking account of the corresponding classification properties in the image regions selected by the user, are calculated and indicated to the user. Based on these additional properties, the user can decide to what extent the "machine conception" or "machine idea" agrees with his own idea. Furthermore, the output is possible of numerical data regarding the respective associated image regions: for example, the size or number of given regions. Corresponding numerical evaluations can then be undertaken automatically for similar images, without the user himself having to inspect the similar images.

BRIEF DESCRIPTION OF THE DRAWINGS

Particulars of the present invention are explained in further detail herein below with reference to the accompanying drawings.

FIGS. 3–10 show graphic illustrations of the intermediate results attained in the individual intermediate steps in the process according to the invention, in the example of a cell image.

DETAILED DESCRIPTION OF THE INVENTION

Figure 1:
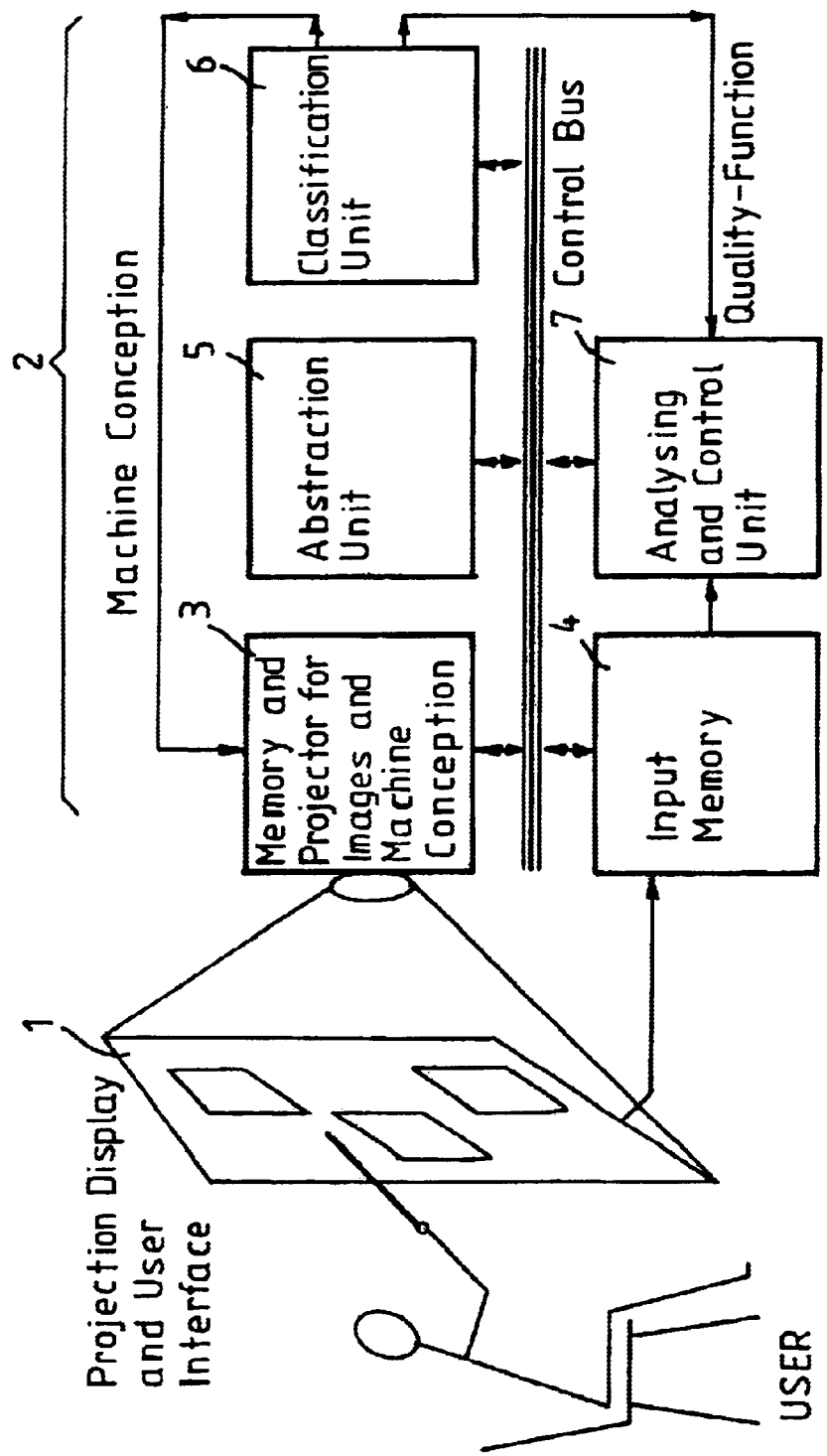
FIG. 1 shows a block circuit diagram of a workplace with a computer, suitable for carrying out the process according to the invention.

The workplace shown in FIG. 1 substantially consists of a computer (2) and an input-output unit (1) attached to the computer. The output unit can be a projection screen, a monitor, or a display. The input unit can be a conventional keyboard or computer mouse.

The computer (2) has, as a hardware component, an image memory (3) in which are stored the image to be analyzed and the "machine conception" or "idea" of the analyzed image produced by the computer after the performance of the process according to the invention. Furthermore, as a hardware component, an input memory (4) is provided in which the user's inputs are stored. The further modules shown in FIG. 1, "abstraction unit" (5), "classification unit" (6), and an "analyzing and control unit" (7) are a combination of hardware and software, namely of a working memory, a computer processor, and program modules stored in the working memory of the computer.

Figure 2:
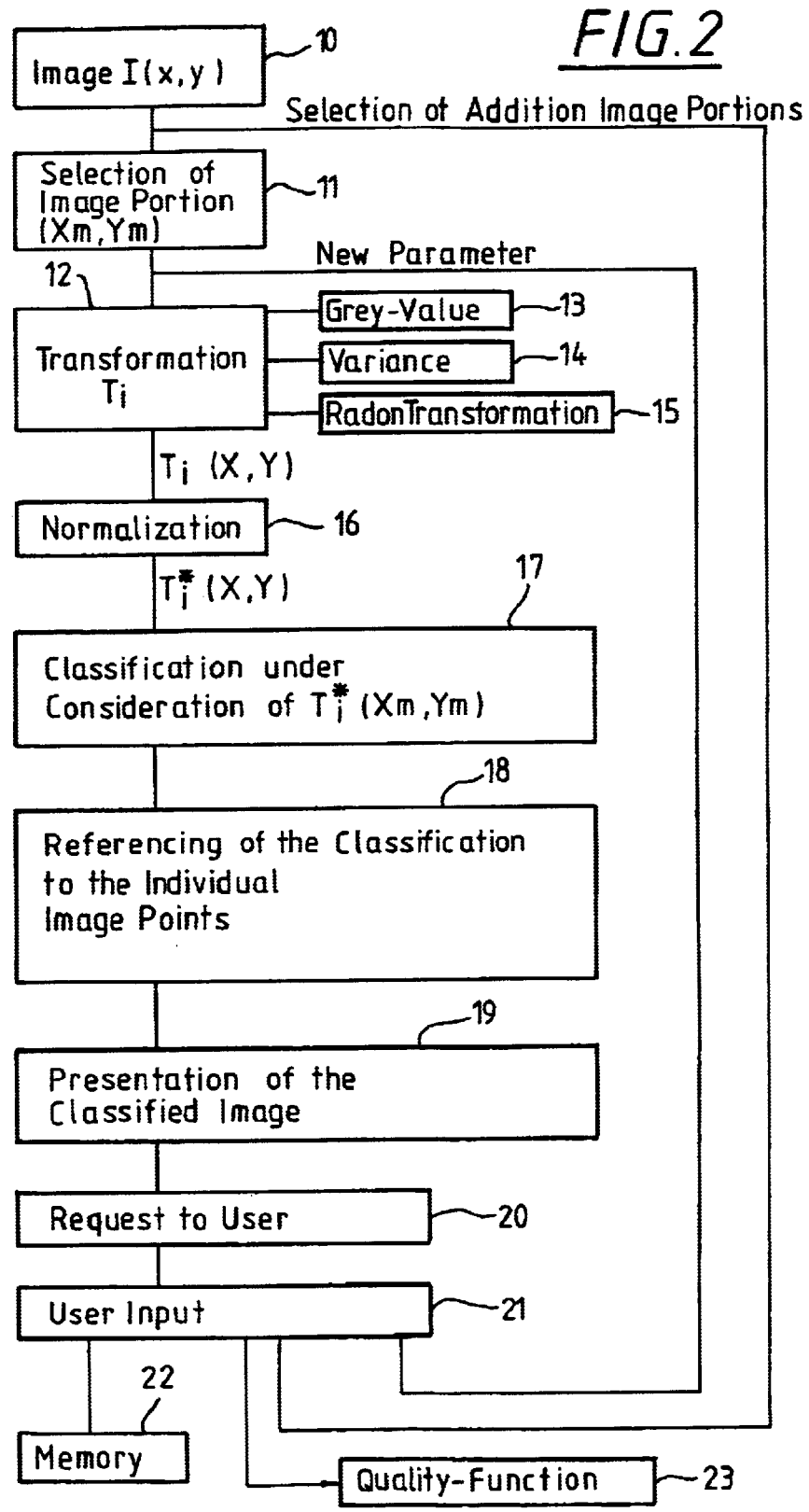
FIG. 2 shows a flow chart of the steps taking place in the process according to the invention.

The individual steps taking place in the process according to the invention are explained hereinafter with reference to the flow chart in FIG. 2.

Firstly, an image stored in the image memory (3) is presented to the observer in a step (10) by means of the output unit (1). This two-dimensional image in general consists of an intensity distribution I as a function of the space coordinates x, y. In a step (11) following thereafter, the user selects, by means of the input unit (1), image regions of interest to him, or the coordinates of the image regions of interest to him. Let coordinates of these image regions or of the selected image pixel be (xm, ym). Then individual small image regions, or else several large image regions, or the whole image, can be selected. When the whole image is selected, the user leaves the further evaluation completely to the image analysis program, at least in a first cycle of the process according to the invention.

In a subsequent step (12), the computer carries out selected transformations Ti on the image in all the image points (x, y). The index i identifies the various transformations. Corresponding transformations can be the formation of the mean of the gray-scale value (13) of the image in the individual image points, or the formation of the variance (14) of the image brightness, respectively in an image point neighborhood of the image. The concepts gray-scale value and variance of the image brightness are also substitutes here for color brightness and variance of color brightness in the different colors. The Radon transformation (15) is a further preprogrammed transformation, particularly for the effective representation of lines and edges. Besides these three cited transformations, yet other transformations can however also be provided which can be selected as desired, or selected by the computer itself.

In step (12), a transformation function Ti(x,y) dependent on the local coordinates (x, y) is calculated for each of the selected transformations. In a normalization step (16) following this, the resulting values of the transformations are normalized to the value range [0, 1]. Various continuous functions can be used for the normalization. The sigmoid function $$y = 1/(1 + \exp(-g^{*(x-x_o)}))$$

has been found to be particularly suitable, since it images an unbounded domain of values onto the desired value range [0, 1]. In a succeeding step (17), a division or classification takes place in the transformation space. As long as no further information is present, for example due to feedback via a quality function, a rough division then takes place of the numerical ranges of the normalized transformation results Ti*(x,y) into three regions, namely small, middle, and large. Moreover, separation rules for the separation of the classes are derived for the division or classification of the normalized transformation result values Ti*(xm, ym) in the image regions selected by the user, taking account of, or with the aid of, these normalized transformation results in the image regions selected by the user.

In a succeeding step, the classification found in the transformation space is referenced or allocated to the individual image points (x, y), and the thus classified image is presented to the observer in the image space in a step (19), either as an independent image or as a superposed representation of the classified image onto the original image.

In a succeeding step (20) the user is questioned as to which way the process is to be continued, or whether the result of the image analysis already agrees with the user's ideas. In a succeeding step (21), the user can effect different inputs by means of the input unit (1). If the result of the image analysis already agrees with the user's ideas, the parameter settings made during the performance of the transformations, normalization, and classification are stored in a step (22) and are thus available for an automatic application to a later image or to a series of images with similar features.

If, however, the user is not yet satisfied with the result of the image analysis, the user can either select additional image regions in the image or correct the selection previously made, the evaluation process returning in this case to the step "selection of image regions" (11). If however the user inputs no new image regions or does not correct the previously input image regions, the computer carries out the process anew with changed parameter settings for the individual transformations Ti or with altered transformations. In this case the program returns to the transformation step (12) described hereinabove. After this return either to the selection step (11) or to the transformation step (12), the process is run through again, until the user is satisfied with the result of the analysis.

The process described in a rather abstract manner up to now is described hereinbelow with reference to FIGS. 3–10 for the example of a microscope image of a nerve cell. In a very first step, before the image analysis proper, the user loads the image of interest into the image memory (3) of the computer, so that the image is displayed on the output unit (1). The original image of a nerve cell presented on the output unit (1) is shown in FIG. 3.

In a succeeding step (FIG. 4), the user selects exemplary image regions. As required, the user can allocate names to these selected image regions, so that it is clear for the image analysis program whether, for plural selected image regions, these are to be considered as different or as image regions which belong together. Image regions with the same name are respectively to be considered as belonging together, and image regions with different names are to be considered as different. The names of the regions are then likewise stored. In the example shown in FIG. 4, the user has made a division into three regions: the image background, the cell body, and the dendrites. The selection of the corresponding image regions can here take place easily with any optional input unit for the image coordinates (mouse, roller-ball, etc.), in that the user roughly moves the cursor around the image regions to be selected and thus draws boundaries. Where there are regions, which are to be classified differently, the user gives each of these regions a different name. If on the other hand the regions are not to be classified differently, the user gives these regions the same name.

Since there are no further user inputs into the system, and the present indications of the user are two-dimensional, the evaluation and control unit (7) instructs the abstraction unit (5) to apply translationally and rotationally invariant transformations to this image. Suitable for this purpose are in particular the formation of the local mean and local variance of the image brightness or of the color brightness for each picture element of the image. Consequently, two transformed intermediate images are formed in the abstraction unit, namely an intermediate image of the moving average of the gray-scale value (FIG. 5) and an intermediate image of the variance of the gray-scale value over predetermined regions (FIG. 6). However, these images in the transformation space are in the usual manner not presented to the user.

It is to be remarked at this point that other suitable transformations, or possibly also more than two transformations, can be carried out according to the user indications. For example, if the image regions selected by the user were of a linear nature, a Radon transformation would also be carried out as a further transformation in the transformation step (2) (FIG. 2).

In a succeeding step, automatic normalization now takes place. This is appropriate, since the numerical ranges of the transformation results can be very different, according to the transformation and the actual image content, and the transformation results have to be able to be expressed in a uniform relationship to each other. By the normalization, the numerical ranges of all the transformations are brought to the numerical range between 0 and 1 by means of a sigmoid function.

The resulting values of the individual transformations are now transmitted from the abstraction unit (5) to the classifier (6), which sets them in a relation to each other. In the above-described case with only two transformations, it is a two-dimensional relationship, which can be represented imagewise as a two-dimensional histogram. This histogram is shown in FIG. 8, in which the mean (m) is plotted toward the right and the variance (v) downward. The classifier now determines, with the aid of the user's indications which are present, those regions in the transformation space which correspond to the user's ideas. For this purpose, there is tested, for example, which normalized transformation result values for the various transformations which were carried out, in this case formation of the mean and variance, are present in the image regions selected by the user. In transformation space, those points are then determined to be class centers in which the transformation result values agree with the transformation result values in the image regions selected by the user. The formation of an idea of the machine now consists in that it extends the surroundings of each class center until the class boundaries adjoin each other. In this sense, the user's indications are generalized until the whole parameter space is filled. The "machine conception" or "machine idea" ("machine conception" or "machine idea" means the representation which can be seen from the viewpoint of the machine or by an observer having the machine's knowledge) is shown in FIG. 7 in the transformation space, the respective class centers being marked as black points.

This image also is not necessary for the observation and evaluation of the result by the user and is usually not shown, but is only present in the computer as an intermediate image.

An alternative to the definition of the class regions consists of explicitly representing the mutually adjoining class boundaries by separating surfaces (by which n-dimensional surfaces are meant, where the dimension of the surfaces results from the number of transformations). Sigmoid functions are preferably used for such separating surfaces, such as are also used for the normalization of the respective selected transformation space.

The classification formed in the transformation space is next again referenced or allocated to the individual image points in the image space, and the "machine conception" or "machine idea" of the original image thus generated is now transferred back to the image memory (3) and presented to the user in a suitable manner in the image space, for example as a proper image or as a superposition of the original image and the "machine conception" or "machine idea". The "machine conception" or "machine idea" in the image space is shown in FIG. 9.

If the user's idea of the classification of the object does not agree with the presented "machine conception" or "machine idea", the user can input further indications for his idea, for example in that further regions are marked in the image, or the previous markings are altered.

Further inputs by the user preferably serve for the refining or the generalization of image regions already input in the sense of hierarchies. Thus, for example, the whole region of the dendrites according to a general, superordinate representation can be further resolved into the individual dendrites. This has the advantage that the search for individual dendrites can be restricted to the region of the dendrites, so that (a) computing time can be saved, and (b) the accuracy of determination of the individual dendrites can be increased, since in this case, for a renewed, further transformation, the whole transformation space alone can be exhausted for the determination of the dendrites.

If the user inputs no further indications, the program assumes that the "machine conception" or "machine idea" agrees with the user's idea, and the user can input further analysis tasks, for example as regards the size of the cell body. The analysis program consequently determines the number of picture elements in the class of the cell body and outputs the result to the user after suitable scale conversion.

It should be expressly remarked at this point that the procedure described hereinabove can be carried out both with an optional number of user indications and also with an optional number of transformations. Furthermore, optional evaluation functions (determination of the size of regions according to length, width, and area, density of the regions, etc.) can be applied to the structures processed and classified with the described process.

Further information arises in the classifier (6) in addition to the "machine conception" or "machine idea" of the analyzed image. A quality of this "machine conception" or "machine idea" can also be stated. Considering the "machine conception" or "machine idea" in the transformation space (FIG. 7), it can be recognized that the different class sizes are different and the class centers have different distances from one another. The smaller the distances between the class centers, the more likely is the risk of a confusion; or the greater the distance between the class centers, the smaller is the risk of a confusion. These additional data can also be transformed back into the image space, in that the associated class distance in the transformation space is allocated to each picture element as a parameter. This quality function in the image space, which states an opinion concerning the quality of the "machine conception" or "machine idea", is shown in FIG. 10 for the image in FIG. 9. Here dark image points stand for small distances of the class centers in the transformation space, and thus for low quality and a high risk of confusion, and bright picture elements stand for large distances of the class centers in the transformation space, and for high quality and a low risk of confusion.

This quality function is transmitted from the classifier (6) to the evaluation and control unit (7), and serves there for automatic decision concerning the most favorable transformations or respectively, the most favorable parameters for these transformations. A further optimizing cycle can be automatically initiated here, according to computing time requirements or the reaction desires or accuracy desires of the user, in that the program returns anew to the transformation step and performs the transformations anew with altered parameter settings.

Figure 11:
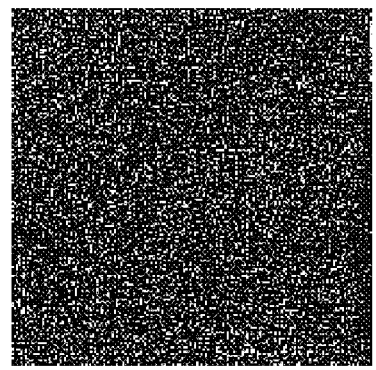
FIGS. 11–13 show graphic illustrations of the results when applying the process according to the invention to a simple gray-scale image.
Figure 12:
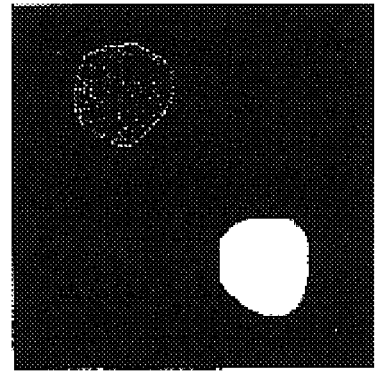
Figure 13:
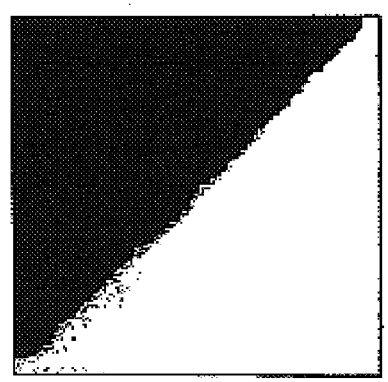

A further very simple example, which however well illustrates the performance of the process according to the invention, is shown in FIGS. 11—13. FIG. 11 shows the original image, which has a variance of 1.0 above a diagonal running from bottom left to top right, and a variance of 1.4 below this diagonal. The mean gray-scale value is constant over the whole image. In the original image, only a slight difference in the magnitude of granularity can be distinguished with the naked eye. However if, based on corresponding expectations, the observer marks that a difference must be present between the two image halves, and gives different names to these two image regions above and below the diagonal, the transformations of gray-scale value and variance of the gray-scale value are again automatically carried out by the machine, and the "machine conception" or "machine idea" shown in FIG. 13 is produced and presented to the user. In contrast, the solution of this task would not be possible with the known process of fractal hierarchy, since the variance of the color value or gray-scale value is only an auxiliary or control quantity in the fractal hierarchy, while in the process according to the invention the individual transformations to be carried out are considered as equivalent, orthogonal or mutually complementary quantities.

I claim:

1. A process for cyclic, interactive image analysis, of an image having individual image points, said image defining an image space, comprising the steps of:
   (a) selecting by a user of image regions of interest in said image,
   (b) performing preprogrammed transformations on said image at one of all individual image points and a selection of individual image points, said performing generating transformation result values defining a transformation space,
   (c) normalizing said transformation result values which provides a normalized transformation space,
   (d) dividing said normalized transformation space into classes with the aid of separation rules that are derived from normalized transformation result values in said image regions selected by the user, said dividing resulting in a classification,
   (e) allocating the classification obtained in said normalized transformation space to said individual image points resulting in a classified image in said image space, and
   (f) presenting said classified image in said image space.

2. The process according to claim 1, wherein said preprogrammed transformations include formation of a mean of at least one of color value or gray-scale value and formation of variance of the color value or gray-scale value in an image point neighborhood.

3. The process according to claim 1, wherein said preprogrammed transformations include a Radon transformation for effective representation of lines and edges.

4. The process according to claim 1, wherein division of said normalized transformation space takes place such that regions in the transformation space are identified in which normalized values of each of the performed transformations correspond to normalized values of the same transformation in said image regions selected by the user.

5. The process according to claim 4, wherein a sigmoid function is used for normalization of said normalized values.

6. The process according to claim 1, wherein the process steps (a)–(f) are repeatedly performed on the same image for one of hierarchical refining or generalization of said classification.

7. The process according to claim 1, wherein the process steps (b)–(f) are repeatedly performed on the same image with at least one of different transformations and parameters of said transformations.

8. The process according to claim 1, wherein sequences of transformations, normalizations and classifications are interactively determined and are stored on an storage medium.

9. The process according to claim 8, wherein said interactively determined sequences are subsequently applied to other images.

10. The process according to claim 1, wherein additional properties of said classification are calculated considering classification properties in image regions selected by the user.

11. The process according to claim 10, wherein said additional properties are color values, image brightness, and at least one of variance and class form.

12. A computer system suitable for performance of a process according to claim 1, having devices for interactive input and selection of image regions.

13. A computer program that is stored in a computer readable medium/memory of a digital computer and having a software code for performance of a process with the steps according to claim 1 when said software code runs on said computer.

14. A computer program that is stored in a computer readable medium/memory of a digital computer, having a software code that enables said computer with the computer program loaded into said memory to perform a process with the steps according to claim 1, wherein said software code runs on said computer.

15. The process according to claim 2, wherein said preprogrammed transformations include a Radon transformation for effective representation of lines and edges.

* * * * *